(12) United States Patent  
Tan

(10) Patent No.: US 8,521,468 B2  
(45) Date of Patent: Aug. 27, 2013

(54) DIAGNOSTIC METHOD FOR USE WITH A VEHICLE DYNAMIC CONTROL SYSTEM (VDCS)

(75) Inventor: Hualin Tan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 12/862,916

(22) Filed: Aug. 25, 2010

(65) Prior Publication Data

US 2012/0053853 A1  Mar. 1, 2012

(51) Int. Cl.  
*G01P 3/00* (2006.01)

(52) U.S. Cl.  
USPC .......................................................... 702/148

(58) Field of Classification Search  
USPC ............. 702/93, 96, 117, 141, 142, 145, 148, 702/182, 183, 193, 34–36; 701/29, 36, 89, 701/91  
See application file for complete search history.

(56) References Cited

U.S. PATENT DOCUMENTS

| | | | |
|---|---|---|---|
| 6,101,434 A * | 8/2000 | Irie et al. ......................... | 701/36 |
| 6,829,524 B2 * | 12/2004 | Chee ................................. | 701/1 |
| 8,229,642 B2 * | 7/2012 | Post et al. ....................... | 701/91 |
| 2004/0030473 A1 * | 2/2004 | Lu et al. .......................... | 701/36 |
| 2005/0071061 A1 * | 3/2005 | Kato et al. ...................... | 701/41 |
| 2011/0295457 A1 * | 12/2011 | Linda et al. .................... | 701/29 |
| 2012/0179349 A1 * | 7/2012 | Yamakado et al. ............. | 701/89 |

* cited by examiner

*Primary Examiner* — Mohamed Charioui  
(74) *Attorney, Agent, or Firm* — Lionel D. Anderson; Reising Ethington P.C.

(57) ABSTRACT

A diagnostic method for improving the reliability, accuracy, efficiency and/or robustness of a vehicle dynamic control system (VDCS) by providing analytical redundancy for one or more sensor readings. Sensor readings such as wheel speed, yaw rate, lateral acceleration, longitudinal acceleration and steering angle are oftentimes related to one another. Thus, the diagnostic method may use these dynamic relationships to detect faults in the sensor readings without having to add additional redundant hardware or use complex circular logic structures, which can increase the cost and impose processing burdens on the VDCS. In an exemplary embodiment, the diagnostic method checks for faulty sensor readings through a process of analytical redundancy that includes intra- and inter-parameter evaluations having linear and forward dependencies.

21 Claims, 4 Drawing Sheets

DIAGNOSTIC METHOD FOR USE WITH A VEHICLE DYNAMIC CONTROL SYSTEM (VDCS)

TECHNICAL FIELD

The present invention generally relates to diagnostic methods and, more particularly, to diagnostic methods that may be used to validate or confirm the accuracy of sensor readings for vehicle dynamic control systems (VDCS).

BACKGROUND

Vehicle dynamic control systems (VDCS) typically use a combination of sensors and feedback loops to control certain aspects of the vehicle. Sensors are placed around the vehicle and measure a number of different dynamic parameters, such as steering wheel angle, wheel speed, lateral acceleration, etc. However, these sensors can sometimes fail. If one or more sensors experience a failure or fault condition that goes undetected, the VDCS could inadvertently rely on faulty sensor readings when performing its duties.

Some vehicle manufacturers have addressed this challenge by adding additional and redundant sensor hardware to the vehicle. But such an approach usually adds cost and weight to the vehicle. Another approach is to use complex circular algorithms that provide some level of redundancy through circular logic structures. Circular logic structures, however, can result in complicated fault matrices that are resource intensive, hard to calibrate, and easy to false alarm.

SUMMARY

According to one aspect, there is provided a method for validating sensor readings in a vehicle dynamic control system (VDCS). The method may comprise the steps of: (a) receiving a first sensor reading from a first vehicle sensor; (b) validating the first sensor reading with an intra-parameter evaluation that utilizes the first sensor reading; (c) receiving a second sensor reading from a second vehicle sensor; (d) validating the second sensor reading with an inter-parameter evaluation that utilizes the first and second sensor readings, wherein the first sensor reading is already validated; (e) receiving a third sensor reading from a third vehicle sensor; and (f) validating the third sensor reading with an inter-parameter evaluation that utilizes the second and third sensor readings, wherein the second sensor reading is already validated.

According to another aspect, there is provided a method for validating sensor readings in a vehicle dynamic control system (VDCS). The method may comprise the steps of: (a) receiving a plurality of wheel speed readings from a plurality of wheel speed sensors; (b) verifying the accuracy of each of the wheel speed readings by comparing the wheel speed readings to each other; (c) receiving a yaw rate reading from a yaw rate sensor; (d) determining a yaw rate estimate based on the already verified wheel speed readings, and verifying the accuracy of the yaw rate reading if the yaw rate reading corresponds with the yaw rate estimate; (e) receiving an addition reading from an additional vehicle sensor; and (f) determining an estimate for the additional reading based on the already verified yaw rate reading, and verifying the accuracy of the additional reading if the additional reading corresponds with the additional reading estimate.

DRAWINGS

One or more possible embodiments of the invention will hereinafter be described in conjunction with the appended drawings, wherein like designations denote like elements, and wherein.

DETAILED DESCRIPTION

The diagnostic method described below may be used to improve the reliability, accuracy, efficiency and/or robustness of a vehicle dynamic control system (VDCS) by providing analytical redundancy for one or more sensor readings. Sensor readings such as wheel speed, yaw rate, lateral acceleration, longitudinal acceleration and steering angle are oftentimes related to one another. Thus, the diagnostic method may use these dynamic relationships to detect faults in the sensor readings without having to add additional redundant hardware or use complex circular logic structures, which can increase the cost and impose processing burdens on the VDCS. In an exemplary embodiment, the diagnostic method checks for faulty sensor readings through a process of analytical redundancy that includes intra- and inter-parameter evaluations having linear and forward dependencies. For example, the method may validate a first sensor reading, like wheel speed, by comparing it to the wheel speed readings from the other wheels (intra-parameter check). Once the wheel speed is validated, it in turn may be used to predict or estimate a second sensor reading, such as yaw rate (inter-parameter check). A yaw rate sensor reading can then be compared to the estimated yaw rate and, if the two values are within accepted limits, the yaw rate sensor reading is validated and used to predict a third sensor reading (inter-parameter check), and so on. In this way, the diagnostic method validates one sensor reading before using it to confirm the accuracy of another sensor reading. In some embodiments, this "linear" or "forward" arrangement eliminates the need for complex circular logic structures that may slow down and burden the VDCS.

Figure 1:
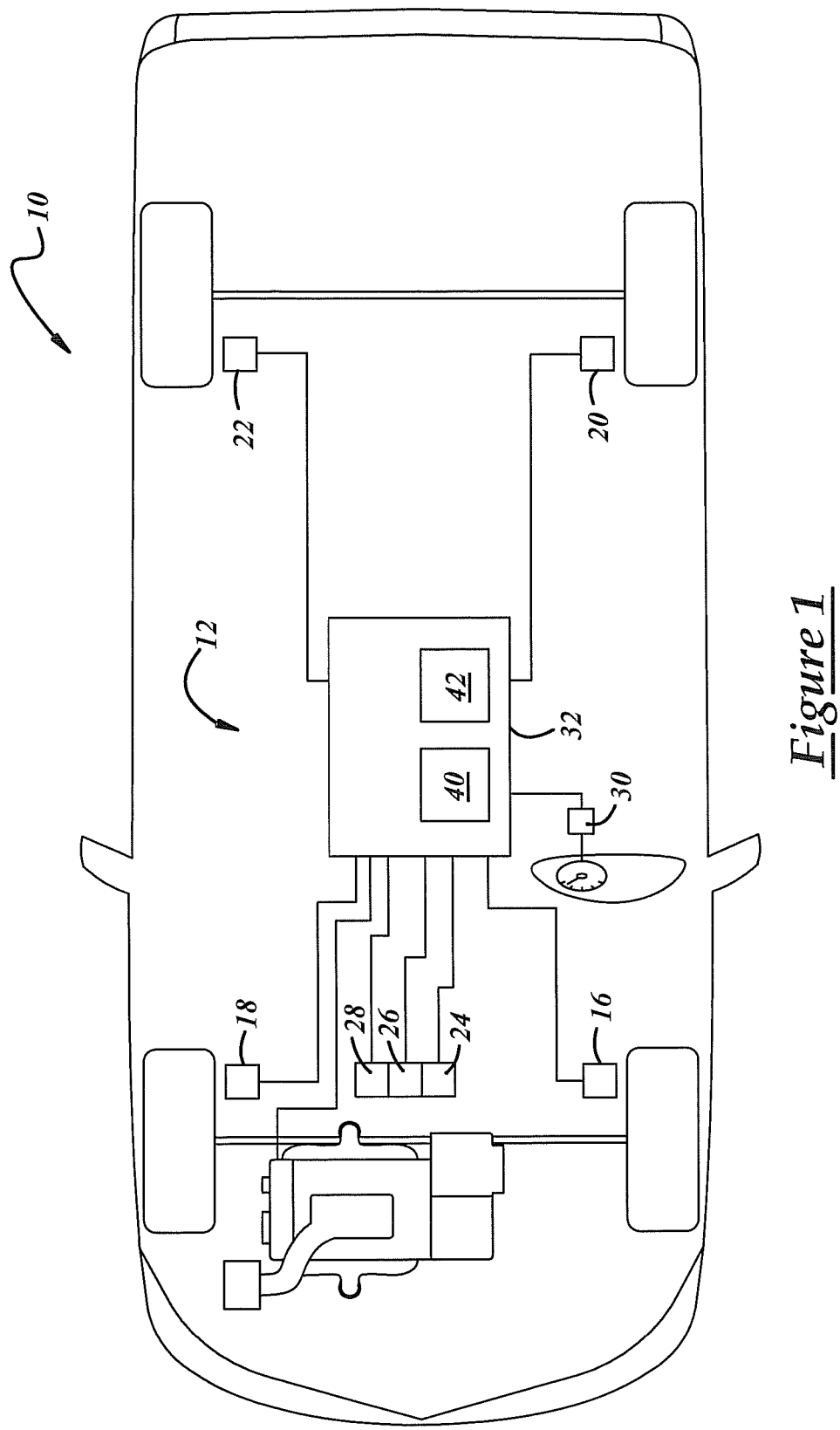
FIG. 1 is a block diagram showing a general overview of certain components of an exemplary vehicle dynamic control system (VDCS)

It should be appreciated that the method described herein may be used with any type of control system that relies on sensor readings, and is not limited to the exemplary VDCS shown in FIG. 1. Although the following description is provided in the context of a traditional vehicle, it should be appreciated that the method may be used in a number of other applications. For instance, the method may be used with sensors found in aircraft, watercraft, military vehicles, farm and agricultural equipment, recreational vehicles (RVs), trucks, motorcycles, all-terrain vehicles, snowmobiles, lawn and garden equipment, and more. Vehicle dynamic control system (VDCS) 12 controls one or more aspects of the vehicle's operation and may be part of any number of different systems, including antilock brake systems (ABS), electronic stability control (ESC) systems, traction control systems, slope detection systems, cruise control systems, as well as other vehicle systems. According to the exemplary embodiment of FIG. 1, a vehicle 10 includes a VDCS 12 having wheel speed sensors 16-22, a longitudinal acceleration sensor 24, a yaw rate sensor 26, a lateral acceleration sensor 28, a steering wheel sensor 30, and a control unit 32.

Any number of different sensors, components, devices, modules, systems, etc. may provide VDCS 10 with data or other input that can be used with the diagnostic method described herein. These include, for example, the exemplary sensors shown in FIG. 1 as well as other components that are known in the art but are not shown here. It should be appreciated that wheel speed sensors 16-22, longitudinal acceleration sensor 24, yaw rate sensor 26, lateral acceleration sensor 28, steering wheel sensor 30, as well as any other sensor located in or used by VDCS 12 may be embodied in hardware, software, firmware or some combination thereof. Sensors 16-30 may directly sense the dynamic parameters for which they are provided, or they may indirectly determine or calculate the dynamic parameters based on readings taken from other sensors, components, devices, modules, subsystems, etc. It is also possible for sensors 16-30 to be part of some other component, module or system in the vehicle (e.g., an antilock braking system (ABS), an electronic stability control (ESC) system, a tire pressure monitoring (TPM) system, etc.), such that the sensor readings used by the diagnostic method are already available in the vehicle. Sensors 16-30 may be directly coupled to control unit 32, indirectly coupled via other electronic components, coupled over a vehicle communications bus, network, etc., or coupled according to some other arrangement known in the art. These are only some of the possibilities, as any type of sensor or sensor arrangement known in the art could also be used.

Wheel speed sensors 16-22 generate wheel speed readings that are representative of the rotational position, velocity and/or acceleration of the wheels. According to the exemplary embodiment shown in FIG. 1, individual wheel speed sensors 16-22 are operably coupled to the four wheels of the vehicle and separately report individual wheel speed readings. These readings may be provided on a constant basis, on a periodic basis, in response to a request from control unit 32, or according to some other technique. Wheel speed sensors 16-22 may utilize a variety of different monitoring or sensing components and technologies, including those based on capacitance, inductance (e.g., Hall-effect sensors), optics, etc. It is possible for wheel speed sensors 16-22 to be part of an antilock braking system (ABS), an electronic stability control (ESC) system and/or a tire pressure monitoring (TPM) system, for example, and for one or more of these systems to provide control unit 32 with wheel speed readings.

Longitudinal acceleration sensor 24 generates longitudinal acceleration readings that are representative of the longitudinal acceleration experienced by the vehicle or some portion thereof. In an exemplary embodiment, longitudinal acceleration sensor 24 is packaged in an inertia measurement unit (IMU) 38 along with yaw rate sensor 26 and lateral acceleration sensor 28. However, these sensors may be packaged individually or with other components instead. Any suitable acceleration sensor or accelerometer may be used, including piezoelectric sensors, piezoresistive sensors, capacitive sensors, and micro electro-mechanical system (MEMS) sensors, to name a few. It is possible for longitudinal acceleration sensor 24 to be part of an antilock braking system (ABS) and/or an electronic stability control (ESC) system, for example, and for one or more of these systems to provide control unit 32 with longitudinal acceleration readings.

Yaw rate sensor 26 generates yaw rate readings that are representative of the yaw rate being experienced by the vehicle or some portion thereof. In general, the 'yaw rate' is a measurement of the vehicle's angular velocity around its vertical axis and it is usually expressed in degrees or radians per second. Yaw rate sensor 26 may be integrated with longitudinal and/or lateral acceleration sensors 24, 28 (e.g., in an integrated inertia measurement unit (IMU)), it may be a standalone sensor, or it may be provided in some other arrangement. In one particular embodiment, yaw rate sensor 26 is mounted in the passenger compartment under the center console and can include a gyroscopic device, as is known in the art. Skilled artisans will appreciate that yaw rate sensor 26 may utilize any number of different components, including piezoelectric sensors, MEMS sensors, or any other sensing component or element that can detect and report yaw rate. It is possible for yaw rate sensor 26 to be part of an antilock braking system (ABS) and/or an electronic stability control (ESC) system, for example, and for one or more of these systems to provide control unit 32 with yaw rate readings.

Lateral acceleration sensor 28 generates lateral acceleration readings that are representative of the lateral acceleration being experienced by the vehicle or some portion thereof. Lateral acceleration is sometimes noticeable as a centrifugal force moving a vehicle to the outside of a curve when a vehicle is cornering, for example. As mentioned above, lateral acceleration sensor 28 may be packaged in the same housing or unit as longitudinal acceleration sensor 24 and/or yaw rate sensor 26. Some examples of suitable lateral acceleration sensors include MEMS type sensors and tuning fork-type sensors, although any type of acceleration sensor or accelerometer may be used. It is possible for lateral acceleration sensor 28 to be part of an antilock braking system (ABS) and/or an electronic stability control (ESC) system, for example, and for one or more of these systems to provide control unit 32 with lateral acceleration readings.

Steering wheel sensor 30 generates steering angle readings that are generally representative of the angular position, movement and/or state of a steering wheel. There are a number of different steering wheel sensors known and used in the art, any one of which may be used here. For instance, steering wheel sensor 30 could be located near the point where the steering wheel is attached to the steering column, or it could be located further down the steering column away from the steering wheel. These are only two possibilities, as numerous other examples could also be employed. It is possible for steering wheel sensor 30 to be part of an antilock braking system (ABS) and/or an electronic stability control (ESC) system, for example, and for one or more of these systems to provide control unit 32 with steering angle readings.

Control unit 32 is an electronic device, such as a vehicle electronic module, that is located in the vehicle and may perform the diagnostic method described herein. As mentioned above, the diagnostic method is designed to improve the reliability, accuracy, efficiency and/or robustness of vehicle dynamic control system (VDCS) 10 by providing analytical redundancy for one or more sensor readings. This analytical redundancy exploits dynamic relationships between various dynamic parameters, and may occur at control unit 32. Depending on the particular embodiment, control unit 32 may be a standalone component (as schematically illustrated in FIG. 1), it may be incorporated or included within another vehicle electronic module (such as an electronic stability control (ESC) module), or it may be part of a larger network or system (such as a traction or stability control system, etc.), to name a few possibilities. According to an exemplary embodiment, control unit 32 is part of an electronic stability control (ESC) system, receives input from sensors 16-30, and provides outputs to one of a number of different destinations. In addition to a variety of other tasks, control unit 32 may execute one or more steps of the diagnostic method described herein, and by doing so improve the reliability of sensor readings from sensors 16-30.

Control unit 32 may include any combination of electronic processing devices, memory devices, input/output (I/O) devices, and other known components. The control unit can be electronically connected to other vehicle devices and modules via a suitable vehicle communications network, and can interact with them when required. In an exemplary embodiment, control unit 32 includes an electronic processing device 40 and an electronic memory device 42. Electronic processing device 40 may execute electronic instructions that are part of software, firmware, programs, algorithms, scripts, state machines, etc. stored in electronic memory device 42, for example. These electronic instructions may govern a number of different processes, including the diagnostic method described herein. Electronic processing device 40 may include a microcontroller, a microprocessor, a complex programmable logic device (CPLD), a field-programmable gate array (FPGA), an application-specific integrated circuit (ASIC), a computer, and/or other hardware that is capable of processing data and providing feedback. Electronic memory device 42 may include any suitable form of electronic memory and, depending on the particular embodiment, can also store various sensor readings, predetermined values, look-up tables and/or other data structures. These are, of course, only some of the possible functions and capabilities of control unit 32, as other embodiments are certainly possible.

Again, the preceding description of vehicle dynamic control system (VDCS) 10 is only meant to be a general and exemplary description of one possible system where the diagnostic present method may be used. The diagnostic method described below is not limited to this exemplary system and may be used with any number of other vehicle systems.

Figure 2:
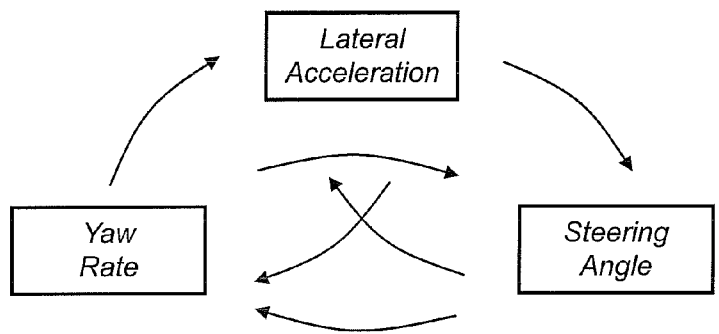
FIG. 2 is a graphical representation of a prior art method that includes a circular logic structure.

An example of a circular logic structure in the prior art is generally and schematically illustrated in FIG. 2. The general logic flow shown in FIG. 2 is neither linear nor forward, as the circular logic structure uses a complicated fault matrix having a series of intertwined forward and reverse evaluations to confirm the sensor readings in question. For example, in order to detect a yaw rate fault, the prior art method not only must check the correlation of yaw rate and lateral acceleration, but also check the correlation of yaw rate and steering angle. As is appreciated by those skilled in the art, each of the two correlations may be valid at different dynamic conditions, which can add another layer of complexity to the detection task. In some cases, the prior art method may even have to check the correlation of steering angle and lateral acceleration in order to detect a yaw rate fault. Such a circular logic structure can make the detection of a sensor fault hard to manage, difficult to calibrate, and vulnerable to a false alarm.

Figure 3:
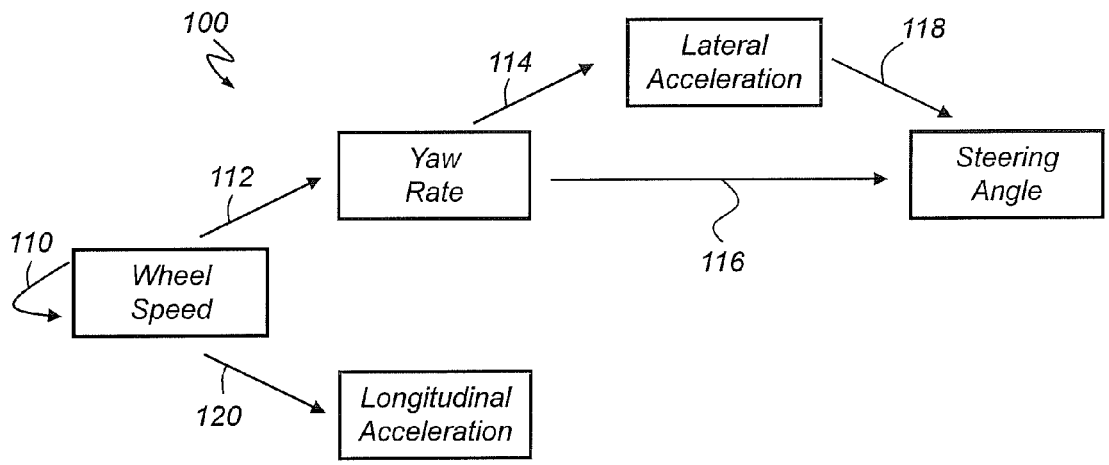
FIG. 3 is a graphical representation of an exemplary method that may be used to validate the sensor readings of a VDCS, such as the one shown in FIG. 1.

Turning now to FIG. 3, there is shown a graphic representation of an exemplary method 100, or at least the general logic flow of such a method. Method 100 checks for faulty sensor readings through a process of analytical redundancy that includes intra- and inter-parameter evaluations or checks that are performed in a linear and forward direction. This process is generally illustrated in FIG. 3. A first sensor reading, like a wheel speed reading, may be validated or verified in step 110 by comparing it to other wheel speed readings from the other wheel speed sensors; this generally constitutes an intra-parameter evaluation because the evaluation does not use dynamic parameters other than wheel speed. Examples of intra-parameter evaluations are provided below. Once the wheel speed readings are validated, they may in turn be used to validate or confirm a second sensor reading, such as a yaw rate reading in step 112; this generally constitutes an inter-parameter evaluation because the evaluation uses an already-validated first dynamic parameter (wheel speed) to validate a second dynamic parameter (yaw rate). The yaw rate reading, which is now validated, may in turn be used to validate a third sensor reading like a lateral acceleration reading in step 114 or a steering angle in step 116, and so on. In this way, method 100 may validate or confirm the accuracy of a sensor reading before using it to evaluate another sensor reading. This "linear" or "forward" dependence may reduce the need for complex circular logic structures or fault matrices, such as the one illustrated in FIG. 2, that can slow down or otherwise burden the vehicle dynamic control system (VDCS) 10 with a complicated series of forward and reverse evaluations.

It should be appreciated that method 100 may include more than one linear path or branch, as demonstrated by step 120 which uses already-validated wheel speed readings to confirm the accuracy of longitudinal acceleration readings. In this example, paths 112 and 120 are both linear and forward paths that originate from the same set of validated sensor readings (i.e., wheel speed readings) like spokes on a wheel. It is also possible for more than one linear and forward path to lead to a single sensor reading. Take the steering angle reading, for example. Paths 116 and 118 are both linear and forward branches that lead to the steering angle reading, yet they originate from different starting points. According to the exemplary embodiment shown here, method 100 is linearly and forwardly arranged so that once a sensor reading is validated or otherwise confirmed, it does not need to be re-confirmed in the same sensor reading cycle. This may not be required of the present method in all embodiments, but is true of exemplary method 100.

Figure 4:
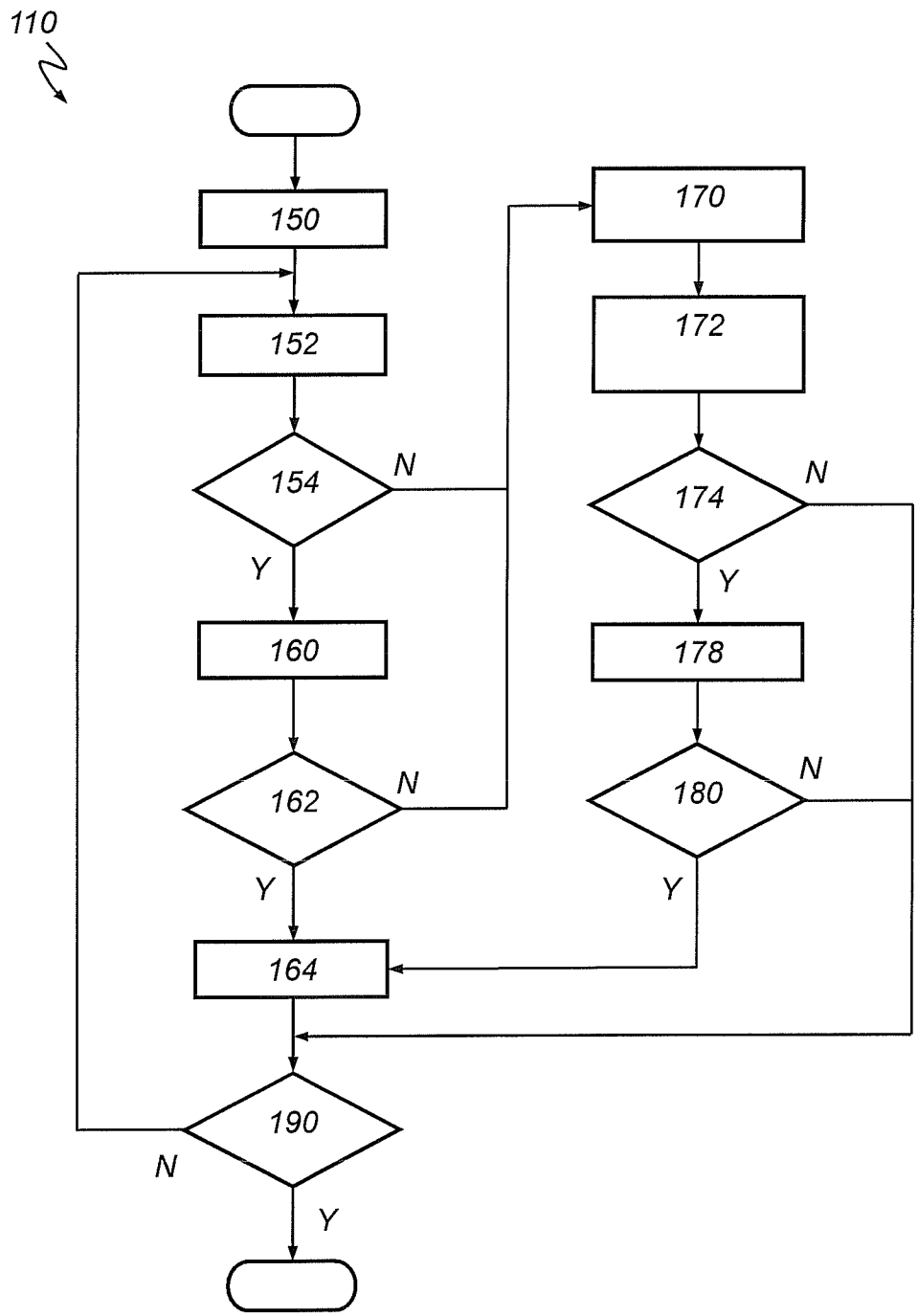
FIG. 4 is a flowchart of an exemplary intra-parameter evaluation that may be used with the method of FIG. 2.

With reference to FIG. 4, there is shown a flowchart of a potential embodiment of intra-parameter evaluation 110, which in this case is used to validate or confirm the accuracy of the wheel speed readings. Intra-parameter evaluations may be used to verify sensor readings other than wheel speed, as that is just one possibility. Intra-parameter evaluation 110 uses two separate checks to verify the accuracy of the various wheel speed readings: a static wheel speed check (steps 150-164) and a dynamic wheel speed check (150-154 and 170-180). These checks only use wheel speed readings and no other dynamic parameters, thus, they are "intra-parameter." Beginning with step 150, the method receives wheel speed readings from wheel speed sensors 16-22. Each of the wheel speed sensors may provide a single sensor reading, an averaged sensor reading, or some other data that is representative of wheel speed. This step does not have to gather wheel speed readings from all four vehicle wheels, as it could gather wheel speed readings from only two or three wheels, for example. Next, step 152 selects one of the wheel speed readings to diagnose or evaluate (i.e., a "target wheel speed reading"); intra-parameter evaluation 110 usually evaluates the wheel speed readings one at a time.

Step 154 determines if the target wheel speed reading is relatively steady or constant, and may do so using one of a number of different techniques. For example, step 154 may look at the target wheel speed reading over a certain amount of time or wheel revolutions in order to determine if the wheel speed stays within a certain percentage range or absolute range (e.g., does not deviate by more than 10% between successive wheel revolutions, etc.). If the driver engages a cruise control feature or simply maintains a relatively constant vehicle speed, then step 154 may determine that the target wheel speed reading is "steady" and could direct the method to step 160. Step 160 calculates or otherwise determines differences in wheel speed between the target wheel and the other wheels, and step 162 compares those wheel speed differences to a wheel speed difference threshold. If all of the wheel speed differences exceed the wheel speed difference threshold, then step 164 will assume that there is a problem or fault condition with this particular sensor reading and declare the target wheel speed reading to be invalid or faulty. The term "differences," as used herein, may include the results of a variety of sensor reading comparisons, and is used interchangeably with the term "residuals," as is appreciated by skilled artisans. In some embodiments, step 164 may require that a fault condition persist for a certain period of time (e.g., a calibratable period of time) before declaring the sensor reading invalid. Steps 150-164 may be referred to as an intra-parameter, static wheel speed check because they only use a single dynamic parameter (wheel speed) to evaluate the sensor reading in question, and they are specifically checking for instances where the sensor reading is in a rather constant or static state. An example of a static fault is where a particular vehicle sensor gets stuck on a certain value and outputs a constant and invalid reading. If step 154 determines that target wheel speed reading is not steady (i.e., it is changing), then the method proceeds to step 170.

In step 170, the method may begin a dynamic wheel speed check by calculating the average of the non-target wheel speed readings (i.e., all of the wheel speed readings except the target wheel speed reading). Any number of different techniques may be used to do this. Next, step 172 determines the difference or residual between the target wheel speed reading and the average wheel speed reading. If the difference is not greater than a wheel speed difference threshold (could be same or different threshold as that used in step 162), then step 174 will assume that the target wheel speed reading is valid and send control of the method to step 190. If the difference is greater than the wheel speed difference threshold, then step 178 determines the differences between the other sensor readings (i.e., the differences or residuals among the speed readings of the non-target wheels) and step 180 compares those differences to a wheel speed difference threshold. This threshold may be the same as or different from the thresholds used in steps 162 and 174. The reason that steps 178 and 180 evaluate the other sensor readings is to see if the target wheel speed reading is the outlier or if one or more of the other sensor readings is the outlier. Consider the example where a vehicle sensor experiences a malfunction that causes it to provide a faulty flittering or vacillating output. Step 154 will recognize that this sensor reading is not steady, step 174 will recognize that this sensor reading differs from the average of the other sensor readings by more than the threshold, and step 180 will recognize that the other sensor readings are consistent with one another. In such a case, the method may conclude that the sensor reading in question is the outlier and is thus faulty. Steps 150-154 and 170-180 may be referred to as an intra-parameter, dynamic wheel speed check because they only use a single dynamic parameter (wheel speed) to evaluate the sensor reading in question, and they are specifically checking for instances where the sensor reading is in a dynamic or non-steady state.

Step 190 checks to see if all of the wheel speed sensors have been checked or evaluated. If not, a new wheel speed reading is selected to be the target wheel speed reading and the method cycles back to step 152 so that the process may be repeated. This continues until all of the wheel speed sensors (e.g., all four wheels) have been evaluated. It should be appreciated that in addition to the static and dynamic wheel speed checks described above, intra-parameter evaluation 110 may use any number of traditional fault detection methods. For instance, intra-parameter evaluation 110 may use range checks where each wheel speed reading is compared against a predetermined range of acceptable values, or it may use rate checks where the rate of change of each wheel speed reading is compared against some acceptable range. Other techniques for corroborating, confirming, verifying or otherwise validating the sensor readings may be used as well.

Figure 5:
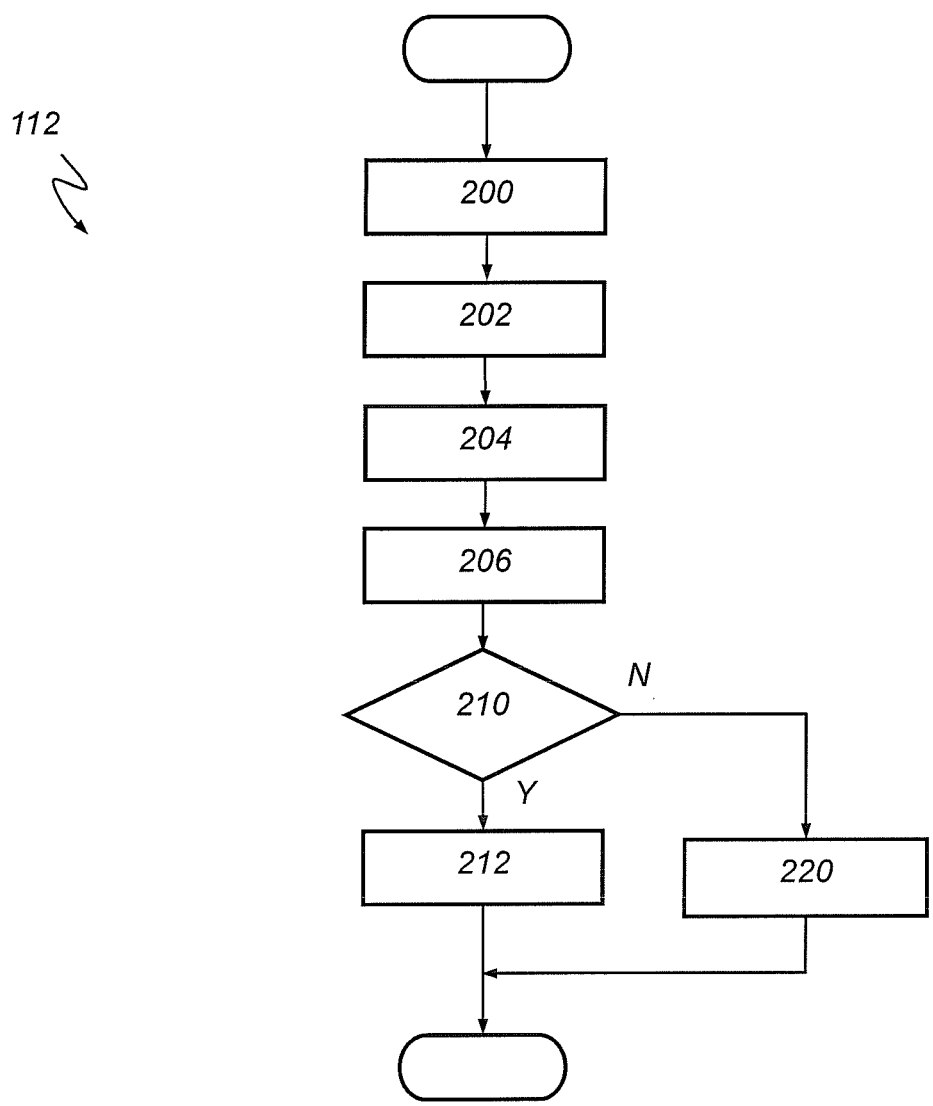
FIG. 5 is a flowchart of an exemplary inter-parameter evaluation that may be used with the method of FIG. 2.

Referring back to FIG. 3, now that intra-parameter evaluation 110 has been completed, method 100 may the already-validated wheel speed readings to perform inter-parameter evaluation 112 (validates yaw rate) and/or inter-parameter evaluation 120 (validates longitudinal acceleration). As mentioned previously, method 100 preferably validates or confirms a dynamic parameter first before using it to validate another dynamic parameter; thus explaining the generally linear and forward progression of the method's logic. FIG. 5 is a flowchart showing an exemplary embodiment for validating a yaw rate reading with inter-parameter evaluation 112.

Starting with step 200, the method gathers or otherwise obtains wheel speed readings and a yaw rate reading. The wheel speed readings have already been validated, and therefore may act as "control" values from which a yaw rate estimate can be generated and compared against a yaw rate sensor reading. In an exemplary embodiment, the already-validated wheel speed readings from evaluation 110 are at control unit 32 and the yaw rate reading is provided by yaw rate sensor 26 to control unit 32 over any suitable communication means.

Steps 202 and 204 calculate $1^{st}$ and $2^{nd}$ Yaw Rate Estimates for the front and rear wheels, respectively, using the already-validated wheel speed readings and the following formulas:

$$\text{1st Yaw Rate } Est. \ (r1) = \frac{WheelSpeedReadingRF - WheelSpeedReadingLF}{FrontTrackWidth} \quad \text{(Equation 1)}$$

$$\text{2nd Yaw Rate } Est. \ (r2) = \frac{WheelSpeedReadingRR - WheelSpeedReadingLR}{RearTrackWidth} \quad \text{(Equation 2)}$$

Equations 1 and 2 represent dynamic relationships that typically exist between yaw rate and wheel speed. But skilled artisans will appreciate that other formulas, equations, relationships, etc. may be used to calculate or otherwise derive yaw rate estimates from wheel speed readings, and that the method is not limited to exemplary Equations 1 and 2.

Step 206 then calculates the differences or residuals between the actual yaw rate reading from yaw rate sensor 26 and the two yaw rate estimates (this produces two separate yaw rate residuals). These yaw rate residuals indicate how close or conforming the actual sensor values are to the estimated values, which are based on already-validated wheel speed values. If both of the yaw rate differences or residuals exceed some yaw rate difference threshold, step 210, then the reading from yaw rate sensor 26 may be declared invalid or faulty at step 212. If only one or neither of the yaw rate differences is greater than the yaw rate difference threshold, then the reading from yaw rate sensor 26 may be declared valid, step 220. A potential reason why step 210 only requires at least one of the two yaw rate estimates to be close to the actual yaw rate sensor reading is because if yaw rate sensor 26 was experiencing a malfunction and was outputting faulty sensor readings, it is rather unlikely that the faulty sensor readings would just happen to be close in value to the independently calculated yaw rate estimates. Thus, step 210 only requires the yaw rate sensor reading to be close to one of the two estimates before being declared valid.

Returning to FIG. 3, intra-parameter evaluation 110 was used to validate the wheel speed readings and inter-parameter evaluation 112 was used to validate the yaw rate reading. At this point, either of these already-validated sensor readings may be used in inter-parameter evaluations to validate or confirm other sensor readings. The particular order or sequence of such evaluations is not critical, as some of the different inter-parameter evaluations may be performed in any sequential order, may be performed concurrently with one another, or may be performed in a combination of sequential and concurrent steps. For example, evaluation 112 may be performed before, after or at the same time as evaluation 120; evaluation 114 may be performed before, after or at the same time as evaluation 116; and evaluation 118 may be performed before, after or at the same time as evaluation 116; to cite a few possibilities. The following description discusses inter-parameter evaluations 114, 116, 118 and 120 without the use of separate flowcharts. The flow or order of steps in these evaluations is generally the same as that shown in FIG. 5, thus, the teachings of that figure are applicable to evaluations 114, 116, 118 and 120 as well. In each of these exemplary evaluations, method 100 uses previously-validated sensor readings to estimate some other dynamic parameter, and then compares the actual sensor reading for that dynamic parameter to the estimate to see if they are similar. If there is good correlation between one or more of the estimates and the actual sensor reading, then that sensor reading may be validated.

Inter-parameter evaluation 114 validates lateral acceleration readings by using previously-validated sensor readings, and may begin by gathering or otherwise obtaining the yaw rate reading validated at 112 and a vehicle speed reading. The vehicle speed reading can be derived from the wheel speed readings that were confirmed at 110 or it can be acquired from some other source in the vehicle, such as a speedometer or an electronic module. In an exemplary embodiment, the already-validated wheel speed readings are used to calculate a vehicle speed reading at control unit 32, the already-validated yaw rate reading is at control unit 32, and the lateral acceleration reading is provided by lateral acceleration sensor 28 to control unit 32 over any suitable communication means. Next, inter-parameter evaluation 114 uses known dynamic relationships between yaw rate, vehicle speed and lateral acceleration to calculate or otherwise determine a lateral acceleration estimate. This estimate may be based on one of a number of different techniques, including using the following equation:

$$\text{Lateral Acceleration Est.}(Ay) = r * V_x \quad \text{(Equation 3)}$$

where r is the already-validated yaw rate reading provided by yaw rate sensor 26, and $V_x$ is the vehicle speed reading, as mentioned above.

Inter-parameter evaluation 114 then calculates the difference or residual between the actual lateral acceleration reading from lateral acceleration sensor 28 and the lateral acceleration estimate generated by Equation 3. If the difference exceeds some lateral acceleration difference threshold, then the reading from lateral acceleration sensor 28 may be declared invalid or faulty. If the difference is less than a lateral acceleration difference threshold, then the reading from lateral acceleration sensor 28 may be declared valid. Again, other techniques, formulas, equations, etc. may be used to generate a lateral acceleration estimate from already-validated sensor readings.

Inter-parameter evaluations 116 and 118 validate steering angle readings by using a previously-validated yaw rate reading and lateral acceleration reading, respectively. These evaluations may begin by gathering or otherwise obtaining the already-confirmed yaw rate and lateral acceleration readings, as well as a vehicle speed. The vehicle speed can be deduced from the wheel speed readings confirmed in evaluation 110 or it can be provided from some other source, as explained above. In an exemplary embodiment, the already-validated yaw rate and lateral acceleration readings are at control unit 32, the vehicle speed is derived from the already-validated wheel speed readings, and the steering angle reading is provided by steering wheel sensor 30 to control unit 32 over any suitable communication means. Next, inter-parameter evaluations 116 and 118 calculate or otherwise determine steering angle estimates using one or more equations. These estimates may be based on one of a number of different techniques, including use of the following equations:

$$\text{Steering Angle Est. based on Yaw}(\delta_{est\_yaw}) = r * \frac{L + K_{us} * V_x^2}{V_x} \quad \text{(Equation 4)}$$

$$\text{Steering Angle Est. based on Lateral}(\delta_{est\_lat}) = \left[\frac{L}{V_x^2} + K_{us}\right] * A_y \quad \text{(Equation 5)}$$

where L is a vehicle constant, the vehicle wheelbase; $K_{us}$, is a vehicle constant, the steady-state understeer coefficient; $V_x$ is the vehicle speed detected either from the wheel speed sensors or a standard tachometer; r is the yaw rate; and $A_y$ is the lateral acceleration.

Inter-parameter evaluations 116 and 118 then calculate the differences or residuals between the actual steering angle reading from steering wheel sensor 30 and the two steering angle estimates generated by Equations 4 and 5 (this produces two steering angle residuals). Like evaluation 112 which also produced two estimates and thus two residuals, if both of the differences or residuals exceed some steering angle difference threshold, then the reading from steering wheel sensor 30 may be declared invalid or faulty. If at least one of the differences is less than the steering angle difference threshold (i.e., the steering angle reading and one of the estimates show good correlation), then the reading from steering wheel sensor 30 may be declared valid. Again, other techniques, formulas, equations, etc. may be used to generate a steering angle estimate from already-validated sensor readings.

Inter-parameter evaluation 120 validates longitudinal acceleration readings by using previously-validated sensor readings, and may begin by gathering or otherwise obtaining the wheel speed readings validated at 110. In an exemplary embodiment, the already-validated wheel speed readings are at control unit 32, and the longitudinal acceleration reading is provided by longitudinal acceleration sensor 24 to control unit 32 over any suitable communication means. Next, inter-parameter evaluation 120 uses known dynamic relationships between wheel speed and longitudinal acceleration to calculate or otherwise determine a longitudinal acceleration estimate. This estimate may be based on one of a number of different techniques, including use of the following equation:

$$\text{Longitudinal Acceleration Est. }(A_x) = \frac{AvgWheelSpeed(2) - AvgWheelSpeed(1)}{IntegrationTime} \quad \text{(Equation 6)}$$

where $A_x$ is longitudinal acceleration, AvgWheelSpeed(2) is the average speed of one or more wheel speed sensors at some point in time 2, AvgWheelSpeed(1) is the average speed of one or more wheel speed sensors at some point in time 1, and IntegrationTime is the time between time 1 and time 2.

Inter-parameter evaluation 120 then calculates the difference or residual between the actual longitudinal acceleration reading from longitudinal acceleration sensor 24 and the longitudinal acceleration estimate generated by Equation 6. If the difference exceeds some longitudinal acceleration difference threshold, then the reading from longitudinal acceleration sensor 24 may be declared invalid or faulty. If the difference is less than the longitudinal acceleration difference threshold, then the reading from longitudinal acceleration sensor 24 may be declared valid. Again, other techniques, formulas, equations, etc. may be used to generate a longitudinal acceleration estimate from already-validated sensor readings.

As mentioned numerous times, method 100 is simply an exemplary method and illustrates one potential embodiment of the present diagnostic method. Numerous differences, features, etc. are possible. For instance, all of the thresholds used in method 100 may be calibratable or programmable such that a user or vehicle manufacturer, for example, can adjust the thresholds. Furthermore, the amount of time that a condition must be satisfied (e.g., the conditions considered in steps 154, 162, 174, 180, 210, etc.) may be calibratable or programmable by a user or vehicle manufacturer. To illustrate, consider step 210 which compares the residuals between yaw rate estimates and a yaw rate reading with a threshold. It is possible for step 210 to require that this condition be satisfied one time (i.e., for a single sensor reading) or for a certain period of time or number of sensor readings (i.e., for multiple sensor readings). For evaluations that generate and compare two estimates, such as evaluations 112 and 116/118, the criteria for determining a sensor reading valid may be altered. It is possible that instead of requiring that at least one of the two residuals be close to a threshold, it is possible to require that both residuals be close to the threshold. For each of the sensor readings discussed above, standard range, rate and/or other checks may be used to validate or verify sensor readings, in addition to the intra- and inter-parameter evaluations. It is also possible to validate additional and/or different sensor readings than those described. For example, the already-validated steering angle reading may be used to verify some other dynamic parameter with which the steering angle has a dynamic relationship. All of the sensor readings that have been validated are at the method's disposal for subsequent validations. Other differences are also possible, as this paragraph only addresses some of the possibilities.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A method for validating sensor readings in a vehicle dynamic control system (VDCS), comprising the steps of:
    (a) receiving a first sensor reading representative of a first dynamic parameter from a first vehicle sensor;
    (b) validating the first sensor reading with an intra-parameter evaluation that utilizes sensor readings representative of the first dynamic parameter;
    (c) receiving a second sensor reading representative of a second dynamic parameter from a second vehicle sensor;
    (d) validating the second sensor reading with an inter-parameter evaluation that utilizes the first sensor reading and sensor readings representative of the second dynamic parameter, wherein the first sensor reading is already validated;
    (e) receiving a third sensor reading representative of a third dynamic parameter from a third vehicle sensor; and
    (f) validating the third sensor reading with an inter-parameter evaluation that utilizes the second sensor reading and sensor readings representative of the third dynamic parameter, wherein the second sensor reading is already validated, and at least one of the validating steps (b), (d) or (f) is performed by a control unit in the vehicle dynamic control system (VDCS).

2. The method of claim 1, wherein step (a) further comprises receiving a plurality of wheel speed readings from a plurality of wheel speed sensors, and step (b) further comprises validating each of the wheel speed readings with an intra-parameter evaluation that does not utilize any dynamic parameters other than wheel speed.

3. The method of claim 2, wherein the intra-parameter evaluation includes a static wheel speed check that: i) determines if a target wheel speed reading is relatively constant, ii) determines wheel speed differences between the target wheel speed reading and the other wheel speed readings, and iii) compares the wheel speed differences to a wheel speed difference threshold.

4. The method of claim 2, wherein the intra-parameter evaluation includes a dynamic wheel speed check that: i) determines a wheel speed difference between a target wheel speed reading and an average of the other wheel speed readings, ii) compares the wheel speed difference to a first wheel speed difference threshold, iii) determines wheel speed differences between the other wheel speed readings, and iv) compares the wheel speed differences to a second wheel speed difference threshold.

5. The method of claim 1, wherein step (c) further comprises receiving a yaw rate reading from a yaw rate sensor, and step (d) further comprises validating the yaw rate reading with an inter-parameter evaluation that involves the yaw rate reading and wheel speed readings that were already validated.

6. The method of claim 5, wherein the inter-parameter evaluation includes using the already validated wheel speed readings to generate first and second yaw rate estimates, comparing the yaw rate reading to the first and second yaw rate estimates, and validating the yaw rate reading based on the results of the comparison.

7. The method of claim 1, wherein step (e) further comprises receiving a lateral acceleration reading from a lateral acceleration sensor, and step (f) further comprises validating the lateral acceleration reading with an inter-parameter evaluation that involves the lateral acceleration reading and a yaw rate reading that was already validated.

8. The method of claim 7, wherein the inter-parameter evaluation includes using the already validated yaw rate reading to generate a lateral acceleration estimate, comparing the lateral acceleration reading to the lateral acceleration estimate, and validating the lateral acceleration reading based on the results of the comparison.

9. The method of claim 1, wherein step (e) further comprises receiving a steering angle reading from a steering wheel sensor, and step (f) further comprises validating the steering angle reading with an inter-parameter evaluation that involves the steering angle reading and a yaw rate reading that was already validated.

10. The method of claim 9, wherein the inter-parameter evaluation includes using the already validated yaw rate reading to generate a first steering angle estimate, using an already validated lateral acceleration reading to generate a second steering angle estimate, comparing the steering angle reading to the first and second steering angle estimates, and validating the steering angle reading based on the results of the comparison.

11. The method of claim 1, further comprising the steps of:
   receiving a longitudinal acceleration reading from a longitudinal acceleration sensor; and
   validating the longitudinal acceleration reading with an inter-parameter evaluation that involves the longitudinal acceleration reading and a wheel speed readings that were already validated.

12. The method of claim 11, wherein the inter-parameter evaluation includes using the already validated wheel speed readings to generate a longitudinal acceleration estimate, comparing the longitudinal acceleration reading to the longitudinal acceleration estimate, and validating the longitudinal acceleration reading based on the results of the comparison.

13. The method of claim 1, wherein the method uses range and/or rate checks in addition to the intra- and inter-parameter evaluations to detect faults in one or more sensor readings.

14. The method of claim 1, wherein the method uses analytical redundancy to detect faults in one or more sensor readings without the use of additional redundant hardware or circular logic structures.

15. The method of claim 14, wherein the method operates in a generally linear and forward direction so that: i) a sensor reading has to be validated before it is used to validate another sensor reading, and ii) once a sensor reading is validated, it is not validated again.

16. A method for validating sensor readings in a vehicle dynamic control system (VDCS), comprising the steps of:
   (a) receiving a plurality of wheel speed readings from a plurality of wheel speed sensors;
   (b) verifying the accuracy of each of the wheel speed readings by comparing the wheel speed readings to each other;
   (c) receiving a yaw rate reading from a yaw rate sensor;
   (d) determining a yaw rate estimate based on the already verified wheel speed readings, and verifying the accuracy of the yaw rate reading if the yaw rate reading corresponds with the yaw rate estimate;
   (e) receiving an additional reading from an additional vehicle sensor; and
   (f) determining an estimate for the additional reading based on the already verified yaw rate reading, and verifying the accuracy of the additional reading when the additional reading corresponds with the additional reading estimate, wherein at least one of the receiving steps (a), (c) or (e) is performed by a control unit in the vehicle dynamic control system (VDCS).

17. The method of claim 16, wherein the additional reading is a lateral acceleration reading and the additional vehicle sensor is a lateral acceleration sensor.

18. The method of claim 16, wherein the additional reading is a steering angle reading and the additional vehicle sensor is a steering angle sensor.

19. The method of claim 16, wherein the method uses range and/or rate checks in addition to intra- and inter-parameter evaluations to detect faults in one or more sensor readings.

20. The method of claim 16, wherein the method uses analytical redundancy to detect faults in one or more sensor readings without the use of additional redundant hardware or circular logic structures.

21. The method of claim 20, wherein the method operates in a generally linear and forward direction so that: i) a sensor reading has to be verified before it is used to verify another sensor reading, and ii) once a sensor reading is verified, it is not verified again.

* * * * *